United States Patent [19]

Stepanian

[11] 4,308,825
[45] Jan. 5, 1982

[54] PET WASTE ODOR REMOVING DEVICE

[76] Inventor: Josephine W. Stepanian, 419 Lakeview Dr., Summerville, S.C. 29483

[21] Appl. No.: 184,152

[22] Filed: Sep. 4, 1980

[51] Int. Cl.³ .............................................. A01K 23/00
[52] U.S. Cl. ...................................................... 119/1
[58] Field of Search ............................... 119/1; 4/484

[56] References Cited

U.S. PATENT DOCUMENTS

| 2,971,493 | 2/1961 | Robb | 119/1 |
| 3,332,397 | 7/1967 | Vander Wall | 119/1 |
| 3,386,417 | 6/1968 | Machowski | 119/1 |
| 3,416,495 | 12/1968 | Wilson | 119/1 |
| 3,495,278 | 2/1970 | Peters | 4/484 |
| 3,752,121 | 8/1973 | Brazzell | 119/1 |
| 3,886,901 | 6/1975 | Zeitter | 119/1 |

*Primary Examiner*—Hugh R. Chamblee
*Attorney, Agent, or Firm*—Larry Harold Kline

[57] ABSTRACT

A device for removing pet odors and holding pet waste materials is disclosed comprising a receptacle; absorbant, porous material placed into the receptacle; screen material placed onto the absorbant, porous material and secured onto the receptacle; and a deodorizing, absorbant, granular material placed onto the screen material.

8 Claims, 4 Drawing Figures

PET WASTE ODOR REMOVING DEVICE

This invention relates to a household pet device and more particularly to an easy and effective method of eliminating household pet waste odor.

A common problem with household pets is the elimination of pet waste materials and the odors emanating from the pet waste materials. One method to attack this problem is the use of litter for cats and other household animals which deodorizes and absorbs urine and is easily disposable. One problem with litter is that the litter must be replaced on a constant basis and, therefore, becomes a considerable expense to the pet owner. The present invention allows litter and similar absorbing, deodorizing products to last longer and, therefore, to allow the pet owner to care for the pet in a more economical fashion.

An object of the present invention is to provide an easy and effective method of eliminating household pet waste odor.

Another object of the present invention is to allow maximum usage of absorbant, deodorizing material, such as litter.

A further object of the present invention is to reduce the cost of absorbant, deodorizing material, such as litter, by reducing the total volume necessary to accomplish the desired purpose.

Still another object of the present invention is to utilize an inexpensive, available material, such as newspaper, to absorb pet waste materials while utilizing an absorbant, deodorizing material, such as litter.

Another object of the present invention is to provide a removable screen material to hold an absorbant, deodorizing material, such as litter, in a manner that urine placed upon the litter will pass through the screen material.

Another object of the present invention is to provide a method and apparatus for holding a screen material onto a waste receptacle in a manner in which the screen material can be easily removed from the waste receptacle.

These and other objects and features of the invention will be apparent from the following description and appended claims.

Briefly, the invention is a device for holding pet waste materals. The device comprises a receptacle, absorbant, porous material placed into the receptacle, and screen material placed onto the absorbant, porous material and secured onto the receptacle. Liquid pet waste materials will pass through the screen material into the absorbant, porous material. An elasticized band is secured within the screen material and is operative to secure the screen material onto the receptacle. A plurality of handles may be secured to the elasticized band in order to aid in the removal of the screen material from the receptacle. The absorbant, porous material may be newspaper. The device may further comprise a deodorizing, absorbant, granular material placed onto the screen material. The deodorizing, absorbant, granular material deodorizes the pet waste materials while allowing liquid pet waste materials to pass through the screen material onto the absorbant, porous material. The deodorizing, absorbant, granular material may be litter. The solid pet waste materials may remain on the deodorizing, absorbant, granular materials until being removed externally.

The invention will be more fully understood from the following detailed description and appended claims when taken with the drawings in which:

Figure 1:
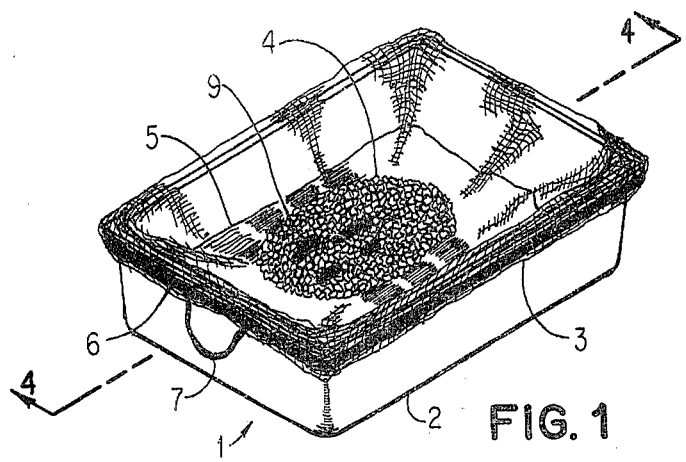
FIG. 1 is an isometric view of the household pet waste odor eliminating device 1.

Referring now to the drawings, FIG. 1 is an isometric view of the household pet waste odor eliminating device 1. Device 1 has a waste receptacle 2 into which the household pet places its wastes.

Figure 2:
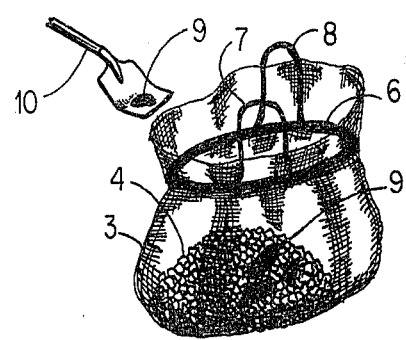
FIG. 2 is an exploded, isometric view of the screen material 3 after being picked up and removed from the household pet waste odor eliminating device 1.

FIG. 2 is an exploded, isometric view of the screen material 3 after being picked up and removed from the household pet waste odor eliminating device 1. The screen material 3 has an elasticized band 6. Elasticized band 6 is an elastic retaining band which performs the function of securing screen material 3 around the waste receptacle 2. The elasticized band 6 may have connected to it handles 7 and 8 to aid in removing and carrying the screen material 3.

Figure 3:
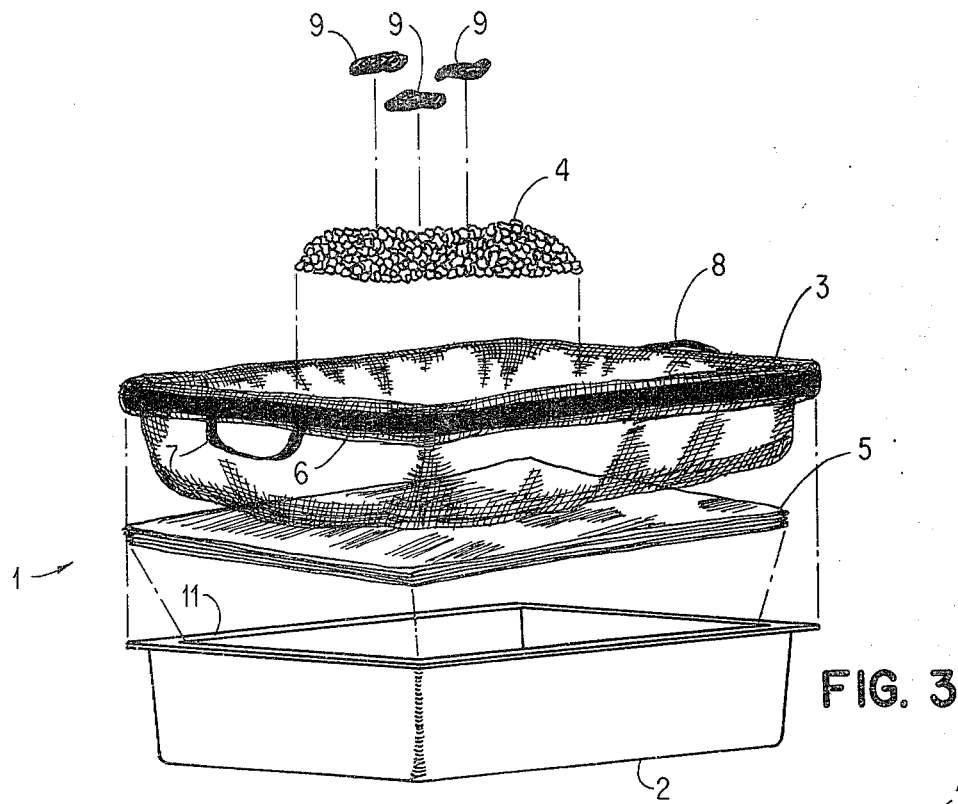
FIG. 3 is an exploded, isometric view of the household pet waste odor eliminating device 1.

FIG. 3 is an exploded, isometric view of the household pet waste odor eliminating device 1. Into waste receptacle 2 is placed an absorbant, porous material 5, such as newspaper. A screen mesh liner, such as screen material 3, is placed onto the absorbant, porous material 5 and is secured around the circumference of waste receptacle 2 by the elasticized band 6.

A deodorizing, absorbant, granular material 4, such as litter, is placed onto the screen material 3. The household pet will place wastes, both solid and liquid, into the deodorizing, absorbant, granular material 4. The solid waste materials 9 will remain on deodorizing, absorbant, granular material 4. The liquid waste materials will be partially absorbed and deodorized by the deodorizing, absorbant, granular material 4, but will mainly pass through the screen material 3 into the absorbant, porous material 5.

The solid waste materials 9 may be removed by some device, such as handling shovel 10, as shown in FIG. 2. When the screen material 3 is removed from the device 1, the elasticized band 6 reduces in size to help insure that none of the deodorizing, absorbant, granular material 4 is spilled out of the top opening of the screen material 3. The handles 7 and 8 are optional and serve the purpose of making the carrying of the screen material 3 easier. The elasticized band 6 may be replaced by any other device which secures the screen material 3 onto the top of rim 11 of waste receptacle 2.

Figure 4:
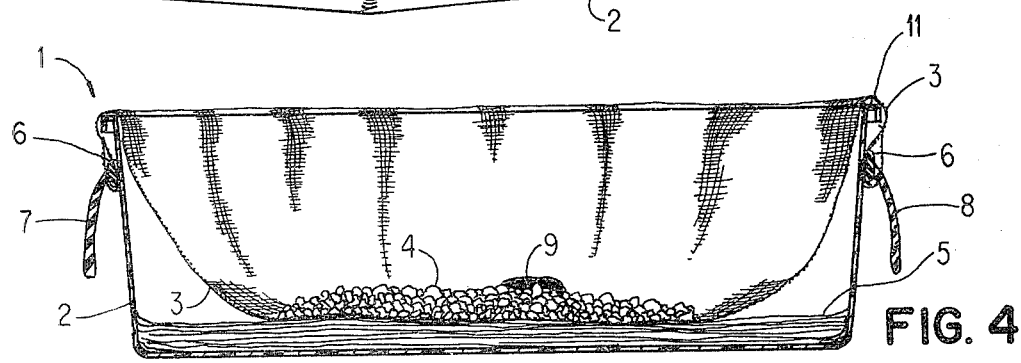
FIG. 4 is a sectional view taken at Section 4—4 of FIG. 1.

FIG. 4 is a sectional view taken at Section 4—4 of FIG. 1. Waste receptacle 2 has a top rim 11. Screen material 3 extends over the top of rim 11 of waste receptacle 2 and is secured by the elasticized band 6. Liner handles 7 and 8 are secured to the elasticized band 6.

In the present usage of the litter or deodorizing, absorbant, granular material 4, the litter is utilized as long as it is fresh. When the odor becomes too much for the household residents, the litter is changed. Under normal usage, the litter may lie directly on a pan and all of the solid pet waste materials and urine will be placed onto the litter. The solid pet waste materials may be removed but the urine or liquid pet waste materials remain until the litter is changed. The entire device, including the screen material, is washable and reusable.

With the present device, a small amount of litter can go a long way. The absorbant, porous material or newspaper absorbs the majority of the liquid pet waste materials or urine. This inexpensive newspaper, which in most cases is simply thrown away as trash, may be replaced on a regular basis inexpensively. By utilizing device 1, the litter or deodorizing, absorbant, granular material 4 can last many times longer than if used alone.

The present invention provides an easy and effective method of eliminating household pet waste odor by allowing maximum usage of absorbant, deodorizing material, such as litter. The present invention also reduces the cost of the absorbant, deodorizing material, such as litter, by reducing the total volume necessary to accomplish the desired purpose. A removable screen material is provided by this invention to hold an absorbant, deodorizing material, such as litter, in a manner that urine placed upon the litter will pass through the screen material. Also the present invention allows for the use of inexpensive, available material, such as newspaper to absorb pet waste materials while utilizing an absorbant, deodorizing material, such as litter. A method and apparatus for holding a screen material onto a waste receptacle is provided in a manner in which the screen material can be easily removed from the waste receptacle.

The present invention provides an inexpensive litter receptacle. The litter receptacle can be used repeatedly. The present invention allows use of screening to hold the litter. The screening may be polyester, plastic, fiberglass, or any desired material. The present invention can be provided in different sizes for various types of household pets. The invention is not restricted to cats, but may be utilized for any household pet desired. The present invention allows a purchased volume of litter to be utilized considerably longer than can be without the present invention. The present invention allows for the virtually complete elimination of household pet odor by making it economical, on a regular basis, to change the absorbant, porous material.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for holding pet waste materials comprising:
    a. a receptacle with vertical sides;
    b. absorbent, porous material placed into said receptacle operative to substantially cover the bottom of said receptacle;
    c. screen material, that is re-usable, placed onto said absorbent, porous material and removably secured onto said receptacle; and
    d. securing means secured within said screen material operative to extend over said vertical sides of said receptacle to secure said screen material onto said receptacle;
    whereby the liquid portion of said pet waste materials will pass through said screen material into said absorbent, porous material.

2. A device according to claim 1 wherein said securing means is an elasticized band secured within said screen material operative to secure said screen material onto said receptacle.

3. A device according to claim 2 comprising a plurality of handles secured to said elasticized band operative to aid in the removal of said screen material from said receptacle.

4. A device according to claim 1 wherein said absorbent, porous material is newspaper.

5. A device according to claim 1 further comprising a deodorizing, absorbant, granular material placed onto said screen material,
    whereby said deodorizing, absorbant, granular material deodorizes said pet waste materials while allowing said liquid portion of said pet waste materials to pass through said screen material onto said absorbent, porous material.

6. A device according to claim 5 wherein said absorbent, porous material is newspaper.

7. A device according to claim 6 wherein said deodorizing, absorbant, granular material is litter.

8. A device according to claim 5 wherein the solid portion of said pet waste materials remain on said deodorizing, absorbant, granular material until being removed externally.

* * * * *